Sept. 2, 1958  E. O. G. KIHLGREN  2,850,044
PERCUSSION DRILL ROD
Filed March 14, 1955
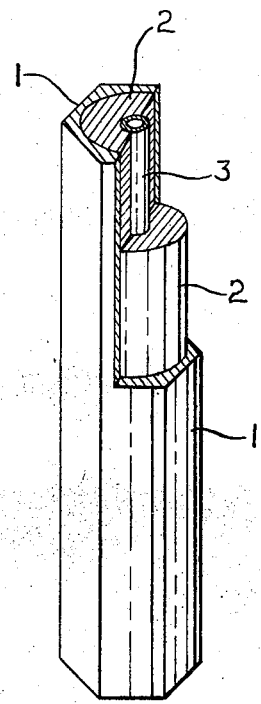
INVENTOR.
Erik Oskar Gösta Kihlgren
by Pierce, Scheffler & Parker
ATTORNEYS

United States Patent Office 2,850,044
Patented Sept. 2, 1958

2,850,044
PERCUSSION DRILL ROD

Erik Oskar Gösta Kihlgren, Sandviken, Sweden, assignor to Sandvikens Jernverks Aktiebolaget, Sandviken, Sweden, a corporation of Sweden Application March 14, 1955, Serial No. 494,133
Claims priority, application Sweden March 17, 1954
4 Claims. (Cl. 138—64)

In the operation of pneumatic drilling machines which are usually used in so-called percussion drilling, the drill rods are subjected to destructive stresses, especially those caused by percussive waves which move in the longitudinal direction of the drill rods at high speed and create alternating pressure and tension stresses. As a consequence fatigue ruptures often occur in the drill rods before the hard metal inserts in the drill bits are worn out. Especially the intensity of the tension stresses is of great importance in determining the life and strength of the drill rods. A decrease of these stresses is thus accompanied by an increased life of the drill rods. Such a decrease of the tension stresses must, however, be effected in such a way that the practical drilling properties of the rods are not unfavourably affected.

The present invention relates to a percussion drill rod structure in which fatigue rupture is greatly reduced and resistance against corrosion is greatly improved. Moreover weak zones, which normally appear after the forging-out of the ends of a drill rod are substantially eliminated.

In the drill rod according to the invention the tension stresses which occur during drilling are substantially neutralized by providing the rod with a layer or layers of suitable thickness, applied with concentrated pressure stresses. The drill rod, which preferably is provided with a flushing channel, is characterized in that its outer surface and/or the surface of its flushing channel is provided with a sleeve or layer of an air-hardening steel alloy while the body of the drill rod consists of an oil- or water-hardening steel alloy which does not substantially harden by cooling in air. By air-hardening steel is meant a steel which hardens in quiet air with the formation of martensite in bodies having a diameter not greater than 2.5 inches.

The invention is illustrated in the accompanying drawing in which the single figure is a front elevational view of a portion of a drill rod with portions broken away to reveal the inner layer 3, the outer layer 1 and the intermediate body portion 2. The structure may be formed by applying the layers 1 and 3 of air-hardening steel in the form of tubes to the body 2 at a suitable stage, for instance before the hot rolling. Thus the tubular layers are forge-welded to the body. During the forge-welding by hot-rolling the surfaces are protected against the oven atmosphere by closing the ends of the spaces between the body and the tubes.

During the cooling of the bar after rolling and in connection with a subsequent normalization the layer or layers undergo a transformation in structure on account of the air-hardening qualities. The transformation involves an increase in hardness and an expansion in volume, resulting in pressure stresses in the layer or layers. It is of great importance that the layer is firmly united with the body of the rod but at the same time the layer and the body, which have different metallurgical qualities, must not continuously merge into each other, i. e. the junction between them must be clearly and sharply defined.

The air-hardening layer preferably consists of a structural steel while the drill rod core or body consists of a tool steel. As an example of an air-hardening structural steel may be mentioned one containing 0.35% carbon, 1% chromium and 4% nickel with a remainder substantially consisting of iron. As an example of a composition for the drill rod body may be mentioned a tool steel containing 1% carbon, 1% chromium and 0.20% molybdenum with the remainder substantially consisting of iron. If desired the layers may be made of corrosion-preventing or corrosion-resistant material.

In order to get the best results the layer or each of the layers may have a thickness of at most 15%, preferably 2-6% of the diameter of the drill rod body. The diameter of a hexagonal drill rod is the distance between two opposite parallel sides. The layers of the finished drill rod preferably have a hardness of not more than 2.7 times the hardness of the core or body of the rod.

Fatigue stresses are caused by alternating strain and pressure stresses in the drill rod for example at the flushing channel. Such stresses often cause ruptures at corrosion points and thus it is seen that the strain stresses are the direct cause of such ruptures. By applying pressure stresses in the inner layer the strain stresses caused by the operation of the drill rod are reduced and the occurrence of ruptures is greatly reduced. This effect is more evident when there are corrosion points at the surface. As will be apparent the drill rod consists of two different materials having different tempering properties. As a result any weak zones which may occur in the body and layer or layers do not coincide and no weak zone extends through the whole rod. As a consequence fatigue ruptures are substantially eliminated.

I claim:

1. A hollow drill rod for percussion drilling comprising an elongated bar having a body portion provided with a longitudinal bore and a layer on the circumferential surface thereof as well as a layer on the surface of the bore thereof, said layers being welded to said body and consisting of steel of the type which when cooled in air substantially transforms into martensite and said body consisting of a steel of the type which when cooled in air remains substantially non-martensitic, said layers being substantially martensitic and said body portion being substantially non-martensitic, each of said layers being from 2% to 15% of the diameter of the body of the drill rod.

2. A percussion drill rod as defined in claim 1 in which the layers consist of structural steel and the body portion consists of tool steel.

3. Percussion drill rod as defined in claim 1 in which the hardness of the layers are not more than 2.7 times the hardness of the body.

4. A hollow drill rod for percussion drilling comprising an elongated bar having a body portion provided with a longitudinal bore and a layer on at least the inner surface of the bore, said layer being welded to said body portion and consisting of steel of the type which when cooled in air substantially transforms into martensite and said body consisting of steel of the type which when cooled in air remains substantially non-martensitic, said layer being substantially martensitic and said body portion being substantially non-martensitic, said layer being from 2% to 15% of the diameter of said body portion.

References Cited in the file of this patent

UNITED STATES PATENTS

| | | |
|---|---|---|
| 1,306,690 | Gillespie | June 17, 1919 |
| 1,357,564 | Hughes | Nov. 2, 1920 |
| 1,697,086 | Pryce | Jan. 1, 1929 |
| 1,947,969 | Brown | Feb. 20, 1934 |
| 2,065,898 | Kreag | Dec. 29, 1936 |
| 2,209,290 | Watts | July 23, 1940 |
| 2,258,564 | Armstrong et al. | Oct. 7, 1941 |
| 2,308,307 | Robinson | Jan. 12, 1943 |
| 2,319,250 | Mitchell | May 18, 1943 |